United States Patent [19]
Blackwell

[11] 3,801,379
[45] Apr. 2, 1974

[54] HOT WATER SURFACE TREATMENT OF ALUMINUM SUBSTRATE

[75] Inventor: Jennings P. Blackwell, Bartlesville, Okla.

[73] Assignee: Philips Petroleum Company, Bartlesville, Okla.

[22] Filed: Jan. 17, 1972

[21] Appl. No.: 218,582

[52] U.S. Cl................... 148/6.27, 117/21, 117/49, 117/132 C
[51] Int. Cl. ............................................. C23f 7/06
[58] Field of Search.......... 148/6.27; 117/132 C, 49, 117/21

[56] References Cited
UNITED STATES PATENTS

| | | | |
|---|---|---|---|
| 3,247,026 | 4/1966 | Switzer | 148/6.27 X |
| 3,563,785 | 2/1971 | Oga et al. | 148/6.27 X |
| 3,634,125 | 1/1972 | Tieszen | 117/49 |
| 3,090,696 | 5/1963 | Gemmer | 117/21 |
| 2,718,473 | 9/1955 | Powers | 117/49 |
| 3,492,125 | 1/1970 | Ray | 99/1 |
| 3,085,034 | 4/1963 | Croessant | 148/6.11 |

Primary Examiner—Ralph S. Kendall

[57] ABSTRACT

An aluminum substrate is rendered more adherent to powder coatings of poly(arylene sulfide) by contacting said substrate with hot water followed by heating said substrate.

11 Claims, No Drawings

HOT WATER SURFACE TREATMENT OF ALUMINUM SUBSTRATE

BACKGROUND OF THE INVENTION

This invention relates to water treatment of an aluminum substrate to improve the adherence of a cured poly(arylene sulfide) coating to said substrate.

Arylene sulfide polymers are ideally suited for coating a variety of articles because of the high temperature stability of such polymers and their ability to withstand chemical attack. These polymers are particularly well suited for coating equipment such as pump impellers, agitator blades, valve parts and the interior of conduits which are used in the handling of corrosive fluids. These polymers also have great potential in coating various items of cookware such as baking pans, skillets and the like because food does not stick to the cured polymeric surface.

In some instances it has been found necessary to utilize primers on certain substrates in order to obtain adequate bonding or to incorporate additives into the polymer to improve adhesion. In any event, it has been found that the coating quality is improved if the polymer is applied in the form of a slurry.

It is readily apparent that it would be very desirable to achieve adequate bonding without the extra step of priming the substrate or incorporating additives into the polymer, particularly since certain additives in cooking applications could present a problem of food contamination. Furthermore, it would be desirable to achieve a good coating simply by applying powder to a heated substrate. While aluminum has been coated and used successfully under certain conditions, it has been found that the coating does not adhere as firmly as desired particularly when it is desired to utilize powder coating.

SUMMARY OF THE INVENTION

It is an object of this invention to provide improved polyarylene sulfide coatings on aluminum; it is a further object of this invention to provide a method of treating aluminum substrates so as to allow direct powder coating of arylene sulfide polymers; and it is yet a further object of this invention to provide an improved method of coating aluminum substrates with polyarylene sulfide.

In accordance with this invention, an aluminum surface is rendered more adherent to poly(arylene sulfide) coatings by treatment with water at a temperature of at least 70°C.

DESCRIPTION OF THE PREFERRED EMBODIMENTS

The instant invention is applicable to treating any substrate made of aluminum or an alloy containing a major portion of aluminum.

The substrate should be contacted with the water for a time generally within the range of 0.1–60, preferably 5–30 minutes, the water being at a temperature greater than 70°C, preferably greater than 75°C, more preferably about 90°–100°C. The most convenient treatment is to immerse the substrate in boiling water. Alternatively, the substrate can be sprayed with steam.

After water treatment the substrate is heated to a temperature between the melting point of the polymer to be applied and the maximum temperature to which the substrate can be heated without damage; generally this will be within the range of 400°–1500°F, preferably 700°–1,000°F.

The treating medium must be water (liquid or steam) or an aqueous mixture comprising a major portion of water. Other liquids have been found to be ineffective.

Polymers applicable to the practice of this invention are arylene sulfide polymers, including polymers and copolymers of the type which are prepared as described in U.S. Pat. No. 3,354,129, issued Nov. 21, 1967, to Edmonds and Hill. As disclosed in that patent, these polymers can be prepared by reacting an aromatic polyhalo-substituted compound and an alkali metal sulfide in a polar organic solvent. The resulting polymer contains the aromatic structure of the polyhalo-substituted compound coupled in repeating units through a sulfur atom. The polymers which are preferred for use in coating procedures are those polymers having the repeating unit $\left[R-S\right]_x$ wherein R is phenylene, biphenylene, naphthylene, biphenyleneoxy or a lower alkyl substituted derivative thereof. By "lower alkyl" is meant alkyl groups having one to six carbon atoms such as methyl, propyl, isobutyl, n-hexyl and the like. Such polymers are desirable because of their high thermal stability and potential availability.

The polymers which are used for coatings in this invention are preferably those which have melting temperatures above 400°F. These arylene sulfide polymers can have melting temperatures in the range of 400°–900°F. Phenylene sulfide polymers normally have melting temperatures in the range from about 550° to 900°F. The preferred polymers have an inherent viscosity in chloronaphthalene at 206°C of at least 0.1, more preferably between 0.1 and 0.3 and ideally between 0.13 and 0.23.

While no adhesion promoter is required for the practice of this invention, the polymers can, of course, contain conventional additives such as antioxidants, UV stabilizers, and the like. Preferred polymer compositions contain polytetrafluoroethylene in addition to the polyarylene sulfide. The polytetrafluoroethylene is present in an amount within the range of 5–20, preferably about 10, weight percent based on the total weight of the composition and makes the resulting product especially suitable for coating cookware. Indeed a surprising feature of the invention is the excellent adhesion obtained even with a composition containing polytetrafluoroethylene which generally drastically reduces the adhesive qualities of the polymer. The polymer composite can also contain pigments such as titanium dioxide which in general tend to improve coating quality.

The polymer for use in the practice of this invention must be in a powdered form. The particle size can vary from the smallest which it is possible to make up to 10,000 microns in diameter. Generally, a powder having a Tyler Standard screen sieve size of 20–325 mesh, preferably 40–200 mesh will be used.

The powder can be applied by means of a flame spray gun, preferably without the use of the flame, by simply immersing the heated substrate in a fluidized bed of powder or in the case of coating the interior of a substrate by tumbling the powder in the heated substrate.

After the coating has been applied it is desirable to cure the coating by heating at an elevated temperature preferably in the range of 500°–900°F and in an oxygen-containing atmosphere, such as air, for about 5 minutes to 24 hours or more. Preferably the coatings are cured at least 60 minutes since tests have shown that some pinholes are present in coatings cured only 30 minutes and even more pinholes are present in coatings cured for only 15 minutes. Additional coatings can be applied to the initial coating if desired, followed in each case by an additional curing period. Coating thicknesses applied by the technique of this invention can vary widely but generally will be in the range of 0.5–50 mils. Coatings having a thickness of 1–30 mils are satisfactory for most uses.

EXAMPLE I

A coupon of alloy 2024 aluminum measuring 3 × 6 × 0.065 inches was immersed in boiling water for 15 minutes. It was then placed in an oven as quickly as could reasonably be done by hand (about 1 minute). The oven was at a temperature of 850°F and the coupon remained therein for 15 minutes. It was then transferred to a hot block to maintain the coupon at about 850°F. A powder composition comprising 90 parts polyphenylene sulfide and 10 parts polytetrafluoroethylene was then sprayed onto the hot aluminum coupon using a flame spray gun without heat. The particle size of the polyphenylene sulfide was about 100 mesh. It was then cured 30 minutes at 700°F.

CONTROL I

An identical aluminum coupon to that used in Example I was coated as in Example I except that the coupon had not been given the boiling water treatment. The coating on the control sample was similar in appearance to that of the sample in Example I. However, the coating on the non-water treated aluminum coupon could be peeled off in whole sheets after starting at the edge of the coupon whereas the coating on the aluminum coupon of Example I was firmly bonded and could only be chipped off with a knife along the edge of the coupon.

Three runs similar to Example I and Control I hereinabove were conducted with the same results.

CONTROL II

An identical aluminum coupon to that used in Example I was treated in an identical manner except instead of a water treatment it was treated for 30 minutes at 90°–100°C in propylene glycol. The resulting coating was similar to that of the above controls, that is, it peeled off in whole sheets.

EXAMPLE II

A coupon identical to that of Example I was coated in an identical manner except that the water treatment was conducted at 70°–75°C instead of at the boiling point of the water. The quality of the coating was better than that of Control I but not as good as that of Example I.

EXAMPLE III

Additional runs were made essentially identical to those of Example I except the time elapsed between the water treatment and heating the substrate was 1, 2, 4, 7, 17, 24, and 120 hours respectively. The runs having an elapsed time of 1, 2, 4, 7, and 17 hours were identical to that of Example I. The sample at 24 hours exhibited slight cracking on bending but did not peel off in large areas as did the control runs. The sample at 120 hours elapsed time was essentially the same as that of Example I. These data indicate that the value for the run at 24 hours elapsed time may have reflected experimental error. Thus elapsed times of 1 minute to 17 hours are preferred but the surprising effect of the water treatment is not dependent on immediate coating of the treated substrate.

While this invention has been described in detail for the purpose of illustration, it is not to be construed as limited thereby but is intended to cover all changes and modifications within the spirit and scope thereof.

We claim:

1. A process for coating an aluminum substrate with an arylene sulfide polymer comprising:

treating said aluminum substrate with water, which water is at a temperature of at least 70°C;

thereafter transferring said thus treated aluminum substrate to a heating zone and heating same to a temperature above the melting point of said arylene sulfide polymer; and thereafter coating said thus heated substrate with said arylene sulfide polymer in the form of a powder.

2. The method according to claim 1 wherein said aluminum substrate is treated with said water for a time within the range of 0.1 minute to 60 minutes.

3. The method according to claim 1 wherein said aluminum substrate is heated to a temperature within the range of 400°–1,500°F.

4. The method according to claim 1 wherein said polymer is polyphenylene sulfide.

5. The method according to claim 1 wherein said arylene sulfide polymer powder has a particle size within the range of 20–325 mesh.

6. The method according to claim 1 wherein said powder is applied by spraying same onto said heated substrate.

7. The method according to claim 1 wherein said treatment comprises immersing said substrate in boiling water.

8. The method according to claim 7 wherein said arylene sulfide polymer is polyphenylene sulfide.

9. The method according to claim 8 wherein said substrate is heated to a temperature of 700°–1,000°F.

10. A method according to claim 9 wherein said polyphenylene sulfide composition contains 5–20 percent polytetrafluoroethylene.

11. A method according to claim 1 wherein said water is in the form of steam.

* * * * *